United States Patent [19]

Miyashita et al.

[11] 4,102,675

[45] Jul. 25, 1978

[54] METHOD OF TREATING MOLTEN SLAGS IN STEEL MAKING PROCESS

[75] Inventors: Yoshio Miyashita; Akira Masui; Kenzo Yamada; Kenji Takahashi, all of Yokohama, Japan

[73] Assignee: Nippon Kokan Kabushiki Kaisha, Tokyo, Japan

[21] Appl. No.: 814,272

[22] Filed: Jul. 11, 1977

Related U.S. Application Data

[63] Continuation of Ser. No. 676,937, Apr. 14, 1976, abandoned.

[30] Foreign Application Priority Data

Apr. 16, 1975 [JP] Japan .................................. 50/45301

[51] Int. Cl.² .............................................. C21B 3/04
[52] U.S. Cl. ............................................ 75/24; 75/30
[58] Field of Search .................................. 75/24, 30

[56] References Cited

U.S. PATENT DOCUMENTS

| 2,467,039 | 4/1949 | Kerschbaum et al. | 75/60 |
| 3,305,355 | 2/1967 | Darrow et al. | 75/132 |
| 3,891,428 | 6/1975 | Yordanor et al. | 75/24 |

FOREIGN PATENT DOCUMENTS

| 8409/61 | 1/1960 | Japan | 75/24 |

*Primary Examiner*—M. J. Andrews
*Attorney, Agent, or Firm*—Moonray Kojima

[57] ABSTRACT

A method of regenerating molten slag remaining in a furnace or converter or the like after tapping of steel, by adding solid carbon and flux to the slag, blowing oxygen into the slag, heating to a temperature of more than 1500° C and agitating. The regenerated slag can be controlled in composition to be most suitable for such ultimate uses as lime, cement, etc.

5 Claims, No Drawings

METHOD OF TREATING MOLTEN SLAGS IN STEEL MAKING PROCESS

This is a continuation of Ser. No. 676,937, filed Apr. 14, 1976, now abandoned.

This invention relates to an improved method of regenerating molten slags in a steel-making process, and more particularly, to a method which contributes to the saving of resources and the removing of environmental pollution by varying the composition of slag.

It is well-known that a great amount of molten slags which reach about 10% of an output of crude steel in a case of a steel-making process, e.g. by Basic Oxygen Furnace, is produced. Such a steel-making slag consists generally of free lime (CaO), dicalcium silicate ($2CaO \cdot SiO_2$), and at the same time, about 15% Fe and about 1% P. In such composition, CaO reacts chemically through contact with water or carbon dioxide gas and the $2CaO.SiO_2$ varies its own cubic volume by phase transformation, thereby bringing about a break down of the slags. When the steel-making slags are employed for such purposes as road bed materials and aggregates which require granular shape, they are unsuitable because of tendency toward the above-mentioned breakdown. When the slags are employed for such purpose as cement materials for which there is no hindrance even if broken down, they are undesirable with respect to their composition, i.e. the amount of Fe, etc. Also when used as a source of lime for blast furnace operation, it is known that there is some limit in their use because of high concentration of [P] in the slags. These examples of problems encountered in the prior art show that there are many difficulties yet to be overcome. Therefore, a few proposals to overcome the above-mentioned difficulties have been suggested as a treating method to regenerate the slags by varying their composition. The art disclosed in Japanese patent application Showa No. 49-83693 (laid open for public inspection) is a representative example.

According to the Japanese laid-open application mentioned above, the art comprises the following steps:
1. Molten slags in steel-making process are transferred into an electrical smelting furnace where sufficient hot metal has been already charged.
2. The slags are heated through the above hot metal to which electric thermal energy is applied.
3. The composition of the slags is varied by chemical reaction between the slags and the hot metal or other flux, and the slags are subjected to the final regeneration.

Such regenerated slags may be utilized as cement materials. However, many difficulties may be pointed out in the above-mentioned process. For instance, there is, first, heat loss brought about by transferring the slags into the melting furnace from the steel-making furnace. The second weakness is that a large amount of hot metal is required as a heating medium. In such a case, the required amount of heat applied to the slags is given by conduction of heat based on relatively expensive electrical energy (e.g. 560 KWH/slag t). The third weakness is that the blowing of a gaseous body (e.g. $N_2$) or aqueous vapor from the bottom of the smelting furnace, or forced agitation by rotating or stirring of said furnace or mechanical agitation by other means are unavoidable, for which some additional equipment is required. The fourth weakness is that control of the hot metal composition is required to adjust the reaction because of the regeneration of the slags through the hot metal. Thus, it should be pointed out that there are the many disadvantages and difficulties to be overcome in the prior art. This is the existing state of the art.

This invention has been developed to overcome the above-mentioned problems of the existing state of the art. The main features lie in the blowing of oxygen into molten slags after the addition of solid carbon and flux.

An object of this invention is to provide a regenerating method of molten slag in steel-making process without any additional equipment.

Another object of this invention is to provide a regenerating method of molten slags in steel-making process, which produces slags most suitable for such purposes or uses as a source of lime, a raw material of cement, a material of roadbed and an aggregate of cement, etc.

The foregoing and other objects of this invention are attained in this invention, which encompasses a method of regenerating molten slag in a steel making process. In the invention method, which may take place in the converter or furnace after the steel is tapped, or in another vessel, molten slag has added thereto solid carbon and flux, then oxygen is blown therein and the temperature is raised to over 1500° C and the slag is agitated. The composition of the slags may be suitably controlled by adding control agents depending upon the ultimate use of the slag, such as for source lime, cement, etc.

Other objects and advantages will be apparent from the following description.

The development of this invention started from the thorough investigations of the possibility to obtain regenerated slags corresponding in composition to the intended uses, in the steel-making furnace, e.g. specially within the converter itself, in special consideration of the tendency that the above-mentioned prior art method suffers in many respects, and above all the process is expensive. Thus, the reason why the thorough investigations are put on the utilization of the converter itself, is first that there is time to spare from tapping to the next steel making operation. If that spare time is utilized to regenerate the slags troubles of transferring molten slags to other vessel for a smelting furnace are avoidable. It will be needless to say that slags in the converter may be treated therein and the merits thereby would be incalculable. The reason lies in the possibility to employ the existing converter facilities. When such a method is realized, there would be no need for additional and auxiliary facilities. Briefly speaking, it may be noted that this is a regenerating method for steel-making slags showing no damage to productivity of the converter in furnace operations and not having any factors of bringing about high cost in furnace facilities. How to realize the above matters is this invention.

The discovery made during the above-mentioned thorough investigations is as follows. That is, when temperature of steel-making slags in more than 1500° C and sufficient amount of [C] is existent, (FeO), ($P_2O_5$) and (MnO) among oxides of the slags are reduced to [Fe], [P] and [MN] by the following formula (1) and accompanied at the same time with, an exothermic reaction of formula (2)

$$(FeO, P_2O_5, MnO) + C = Fe, P, Mn + CO \uparrow \quad (1)$$

$$2C + O_2 = 2CO$$

$$2CO + O_2 = 2CO_2 \quad (2)$$

The measures used in this invention to push the above-mentioned reaction forward are as follows. That is, first, solid carbon and flux for raising fluidity of slags are added to slags in the furnace; secondly, oxygen is blown into the slags for raising its temperature to more than 1500° C and for promoting the reaction by agitating the slags. In this case, the addition of carbon and flux and also blowing of oxygen are done by the existing facilities as they stand. Accordingly there is no necessity for arranging additional facilities.

In advance of the above-mentioned reaction, the reaction of formula (1) is endothermic. The heat loss caused thereby is compensated by the combustion of either the added carbon or carbon monoxide gas produced by formula (1) with the blown oxygen as shown in formula (2). Thus, as to the solid carbon playing an important part in this invention, ordinary coke can be employed well enough. However, some consideration for a size of the coke is required. That is, the size of coke should be prepared in less than 30 m/m, preferably about less than 10 m/m, corresponding to capacity of an employed furnace. The above blowing of oxygen is carried out through the ordinary lance. The reasons for the blowing of oxygen are to have the molten slag come into contact with the added solid carbon by agitation, and to bring about combustion as shown in formula (2). By these measures, the reactions indicated by the above-mentioned formula (1) and (2) are easily and stably pushed forward. Consequently, the melting point of the slag itself rises as the slags become reduced and their fluidity is lowered. This, conversely, brings about a check of the reaction itself. The adding of the flux in this invention is for relieving the above lowering of said fluidity. Any of the known fluxes, e.g. alumina, cryolite, fluorite and others can be employed and selected in consideration of use of the slag after regeneration. As occasion demands, a controlling agent of slag composition is further added. This reason is for varying the composition corresponding to the ultimate use of the slag, not only simply regeneration of the slags.

An actual example by a pilot plant of converter is as follows.

First, after the ordinary oxygen steel-making by 40 Kg converter is finished and the oxygen lance is raised, the molten steel is tapped and molten slags of about 5 Kg remains. And then solid carbon of less than 2 m/m is added in the furnace successively, the lance is pulled down to blow the oxygen into the slag. Thereby, molten slags is agitated by momentum of the blown oxygen and the reaction of the above formula (1) is pushed forward, and at the same time, the combustion of the above formula (2) is advanced. In such a case, advance rate of the both reactions is controlled by nozzle shape, number of nozzle hole and height of the lance and the amount of blown oxygen. The above flux selected for ultimate use of the slag is added correspondingly for the lowering of the fluidity of the slags with the advance of reducing reaction. The [CO] gas generating by reaction of the formula (1) is well fired at the upper portion of the furnace, therefore, the fall of a slag temperature after regeneration is only about 20° C from the tapping temperature.

Table I shows the testing requirements and Table II and III are results.

Table I

| Test requirements | |
| --- | --- |
| Initial molten slag | about 5000g |
| Solid carbon | 500g |
| Flux | cryolite 250g |
| Amount of oxygen | 100 ml/min |
| Regenerating time | 5 min. |

Table II

Variations in Composition and Weight of Slag against the Reaction Time

| | CaO (%) | SiO$_2$ (%) | Al$_2$O$_3$ (%) | HgO (%) | HmO (%) | T.Fe (%) | P$_2$O$_5$ (%) | S (%) | weight (g) | temperature (° C) |
| --- | --- | --- | --- | --- | --- | --- | --- | --- | --- | --- |
| initial slag | 52.20 | 15.31 | 0.89 | 2.85 | 3.85 | 15.30 | 2.18 | 0.11 | about 5000 | 1680 |
| after 2 min. | 59.96 | 18.37 | 2.48 | 5.25 | 0.13 | 4.85 | 0.75 | 0.49 | | |
| after 4 min. | 63.49 | 19.32 | 3.03 | 5.58 | 0 | 2.33 | 0.27 | 0.17 | | |
| after 5 min. | 65.36 | 18.71 | 2.68 | 5.59 | 0 | 2.43 | 0.26 | 0.20 | | 1660 |
| regenerated slag | 65.41 | 18.75 | 2.70 | 5.61 | 0 | 2.38 | 0.19 | 0.21 | 4080 | |

Table III

| Weight and composition of recovered Fe | | | | | |
| --- | --- | --- | --- | --- | --- |
| weight (g) | C (%) | Si (%) | Mn (%) | P (%) | S (%) |
| 940 | 4.95 | 0.16 | 13.0 | 2.57 | 0.003 |

According to the above-mentiond Tables, it will be understood that the oxides of slags are well reduced. That is, (FeO) is reduced by about 90%. The reduced [Fe] is precipitated and collected at the bottom of the slag. The reducing of (MnO) reaches 100% and the reduced [Mn] transfers into the above molten [Fe]. (P$_2$O$_5$) is reduced by about 90%. About 60% of the reduced [P] transfers into the above molten [Fe] and about 40% is vaporized. Such a reducing rate may be easily obtained by controlling the oxygen blowing method, reaction temperature and time. In other words, the controlling of the above-mentioned requirements is varied and selected corresponding to uses of the regenerated slags. For example, in case the regenerated slag is used as lime source for blast furnace the [P] concentration shown in the above Table II is further lowered below 1% and the lowering is achieved easily. In case the regenerated slag is used as cement material, a suitable controlling agent of slag composition is further added. Also, in cases of other uses such as slag wool, aggregate or fillers in civil engineering and construction field; the most suitable composition may be obtained by the above-mentioned control method, without any difficulty and weakness.

It is needless to say that the regeneration of slags is achieved easily not only in the converter itself but also in any other vessel having the same facilities as those of the converter.

According to the above experiments, it can be seen that the regeneration after tapping of steel can be completed in about 5 minutes. Thus, the existing time margin between tapping and subsequent steel making operation may be fully utilized for the regenerating method of the invention. The existing time margin is available in the refining process since the casting process is rate-controlling, not only in the production controlling of steel making but also in the conventional refining-casting process. It is a valuable advantage to be able to carry out a treatment while the slag remains in the converter after the tapping of the molten steel, since the conventional furnace facilities can then be used as they are. It will be appreciated that the treating process, according to the instant invention, is not limited to use of the furnace and facilities per se. For example, the molten slag may be moved, depending on the conditions, into a container which is provided with facilities equivalent to those of the converter for performing the regeneration of the molten slag. Furthermore the regeneration of the slag and the varying of the composition thereof as shown in the experiment, are accomplished with ease.

According to the invention, the regneration and varying are not only performed easily, but also yield of the by-product Fe in considerable amounts in the initial slag in the converter is produced, so as to reduce the requirement of obtaining Fe from other sources. In addition, less waste materials have to be dumped, thereby reducing the dumping space requirements. Thus, the present invention has many industrially useful advantages.

We claim:

1. A process of changing the composition of molten slag, comprising the steps of (A) tapping molten steel from a converter to separate said molten steel from molten slag thereby substantially leaving molten slag remaining therein, said slag comprising $CaO$, $SiO_2$, $MgO$, $MnO$, $FeO$, and $P_2O_5$;
    (B) adding solid carbon and flux to said molten slag remaining in said converter;
    (C) blowing oxygen onto said carbon and flux on the surface of said molten slag to generate exothermic reaction and compensate for heat loss caused by said addition of carbon and flux without addition of any external heat, whereby said molten slag is regenerated to increase the amount of said $CaO$, $SiO_2$, $MgO$ and to decrease the amount of $MnO$, Fe and $P_2O_5$; and
    (D) removing said regenerated slag from said converter and thereby to prepare said converter for another steel making charge.

2. The method of claim 1, wherein said molten slag prior to regeneration comprises 45–50% $CaO$; about 15% $SiO_2$; about 15% total Fe of FeO; 3 to 8% $MgO$; 3 to 4% $MnO$; and 2 to 4% $P_2O_5$.

3. The method of claim 1, wherein said solid carbon is coke and is of a size less than 30 mm.

4. The method of claim 1, wherein said solid carbon is coke and is of a size more than 10 mm.

5. The method of claim 1, wherein said molten slag has added thereto a controlling agent comprising $Al_2O_3$ or $SiO_2$, after said regeneration.

* * * * *